United States Patent
Harrison et al.

(10) Patent No.: US 6,450,485 B1
(45) Date of Patent: Sep. 17, 2002

(54) WATER ENTRY TO THE WATER DISTRIBUTION FOR EVAPORATIVE COOLERS

(75) Inventors: James Robert Harrison, Unley Park; Andrew George Reed, Summertown; Mark Simon Ledson, Pasadena, all of (AU)

(73) Assignee: FF Seeley Nominees Pty Ltd (AU)

( * ) Notice: Subject to any disclaimer, the term of this patent is extended or adjusted under 35 U.S.C. 154(b) by 0 days.

(21) Appl. No.: 09/807,179
(22) PCT Filed: Oct. 7, 1999
(86) PCT No.: PCT/AU99/00865
§ 371 (c)(1), (2), (4) Date: May 29, 2001
(87) PCT Pub. No.: WO00/22353
PCT Pub. Date: Apr. 20, 2000

(30) Foreign Application Priority Data

Oct. 8, 1998 (AU) .............................................. PP 6427
Jun. 8, 1999 (AU) ............................................. PQ 0807

(51) Int. Cl.$^7$ ................................................. B01F 3/04
(52) U.S. Cl. ..................... 261/106; 261/29; 261/DIG. 3
(58) Field of Search .......................... 261/29, 36.1, 97, 261/103, 106, 104, 107, DIG. 3

(56) References Cited

U.S. PATENT DOCUMENTS

| | | |
|---|---|---|
| 2,486,138 A * 10/1949 | Feinberg | 261/97 |
| 2,517,998 A * 8/1950 | Gilchrist, Jr. et al. | 261/97 |
| 2,961,226 A * 11/1960 | Goettl | 261/97 |
| 3,570,822 A * 3/1971 | Peterson et al. | 261/106 |
| 4,029,723 A * 6/1977 | Morrison et al. | 261/29 |
| 4,125,576 A 11/1978 | Kozinski | |
| 4,338,264 A 7/1982 | Seeley | |
| 4,361,525 A * 11/1982 | Leyland | 261/29 |
| 4,460,520 A * 7/1984 | Wrightson | 261/106 |
| 4,468,357 A * 8/1984 | Miller et al. | 261/29 |
| 4,602,487 A * 7/1986 | Seeley | 261/106 |
| 4,615,844 A 10/1986 | Dickison et al. | |
| 5,853,625 A 12/1998 | Kensok et al. | |
| 5,857,350 A * 1/1999 | Johnson et al. | 261/106 |

OTHER PUBLICATIONS

International Search Report dated Nov. 22, 1999.

* cited by examiner

Primary Examiner—C. Scott Bushey
(74) Attorney, Agent, or Firm—Watts, Hoffman, Fisher & Heinke Co., L.P.A.

(57) ABSTRACT

A water entry system for entry of water to a water distribution system for an evaporative cooler includes a conduit for delivering water to at least one of the uppermost corners of the lid of the evaporative cooler. The corner having the conduit includes a capped water entry point that causes the water to form a substantially uniform curtain of water which is in turn feeds the water into a plurality of channels and thus to evaporative pads of the evaporative cooler.

7 Claims, 3 Drawing Sheets

WATER ENTRY TO THE WATER DISTRIBUTION FOR EVAPORATIVE COOLERS

FIELD OF THE INVENTION

This invention relates to the method and means for entry of water to the water distribution system for evaporative pads in fixed or moveable evaporative coolers.

DESCRIPTION OF THE PRIOR ART

One form of evaporative air cooler consists of a cabinet having four or more sides at least one of which contains an absorptive pad in which is contained a fibrous absorption material, a water sump, a pump, water distribution system for wetting the absorption pad, and a fan and motor assembly for drawing air through the wetted absorbent material contained in the pad. The successful operation of such an evaporative cooler relies on water being distributed to the absorptive pads in sufficient quantities and in a consistently uniform manner along the pads. The cooler must have all parts of the absorptive pads constantly wet to perform satisfactorily.

Some of the practical difficulties encountered in this type of cooler are the problems of achieving uniformity of water distribution to all parts of the absorptive pad, and the tendency of water distribution systems to clog with foreign material.

The known methods of water distribution vary considerably. One such existing system pumps the water to a conduit under the cabinet lid with a plurality of holes, which in turn distribute the water into a second distributor, generally in the form of a trough, at the top of the filter pad frame. The holes in the distributor are relatively small and are frequently blocked. While it is possible to arrange for the entry point of water to the distribution system to be at the corners of the cooler, uniformity of water distribution is poor due to the small holes required and variations in flow to the holes from an out of level installation.

Excessive water in parts of the pad can result in water pulling off the filter pads and entering the fan. A deficiency of water in another part of the pad will result in reduced water evaporation and the entry of hot air directly into the cooler thereby diluting air that has been fully cooled by the pads and reducing the cooling capacity of the cooler.

In other systems the pump is connected via a conduit or conduits to a water distributor or distributors, which distribute water to a spreader bar or bars with a plurality of open channels, mounted close to the underside of the cooler lid. One example of such a system is the subject of Australian Patent No. 536805 in the name of the present applicant. This device provides for uniformity of water distribution and resistance to clogging, but requires a central water entry point for the distribution system to each evaporative pad. These systems are less prone to blockages and can tolerate a much greater degree of out of level installation before the uniformity of water distribution is affected. However, since these systems have separate conduits to distributors on each of the absorbent pads, they are relatively expensive and are susceptible to variations in flow to each of the distributors should there be a variation in water pressure in the water piping elsewhere in the cooler.

Since these system require a central water entry point to each of the water distributors, water entry piping is necessarily routed across the air stream of each absorptive pad, and requires a connection to the water spreader inside the airflow space of the cooler. This arrangement has the potential to interfere with the airstream through the pads. Should any failure occur with the water pipe connections in the cooler space or at the connection to the water spreaders, water in large quantities would be introduced into the airstream entering the building. The tendency and consequence of these deficiencies is more pronounced in coolers constructed with an axial fan, rather than a centrifugal fan, since there will always be a direct path between the point of failure and the entry point of the fan.

In all known current water supply and distribution systems, it is necessary to clean the system and remove blockages from inside the body of the evaporative cooler. This has the disadvantage of requiring partial dismantling of the evaporative cooler to gain access to the components which may be blocked. Accurate and complete re-assembly is necessary for the evaporative cooler to operate satisfactorily after clearing the blockage.

The object of the present invention is to provide an improved water entry and supply to the water distribution system of an evaporative cooler, which ameliorates the restrictions and deficiencies of the currently available systems.

SUMMARY OF THE INVENTION

According to one aspect the present invention provides a water entry system for the water distribution system of an evaporative cooler, said water entry system includes conduit means adapted to convey water from a pump of the evaporative cooler to at least one uppermost corner of said evaporative cooler, said at least one corner includes a capped water entry point adapted to output a substantially uniform curtain of water to at least one open channel for conveying water from the water entry system to the water spreader system of the cooler.

BRIEF DESCRIPTION OF THE DRAWINGS

This invention will now be described by way of example with reference to the accompanying drawings which show a schematic of one embodiment of the present invention.

In the drawings.

DESCRIPTION OF THE EMBODIMENT

Figure 1:
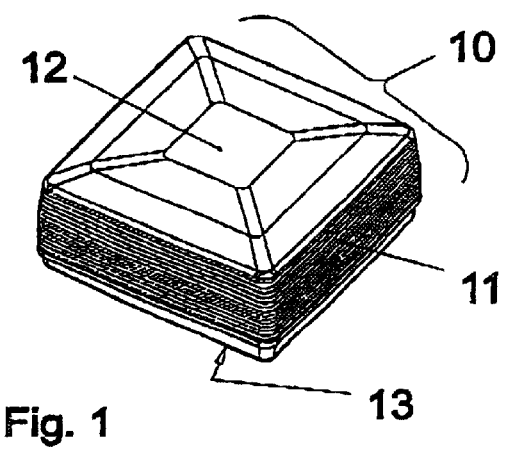
FIG. 1 is an isometric view of the evaporative air conditioner assembly.

In this embodiment, an evaporative air conditioner 10 shown in FIG. 1, comprises a cabinet which itself comprises four side panels 11, a top panel 12, and a base panel 13 which forms a sump for the cooling water.

Figure 2:
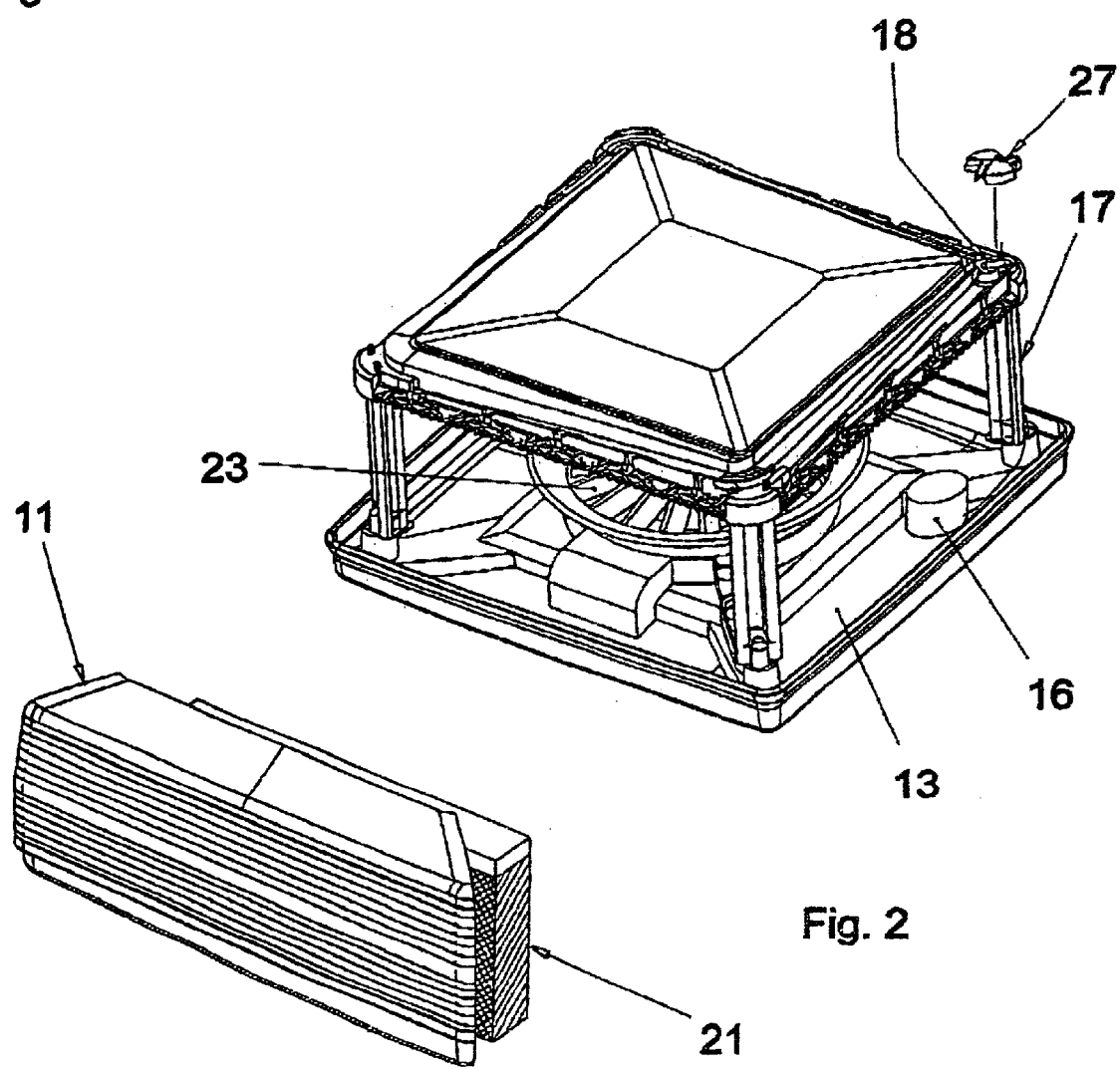
FIG. 2 is an exploded view of the evaporative air conditioner of FIG. 1.
Figure 3:
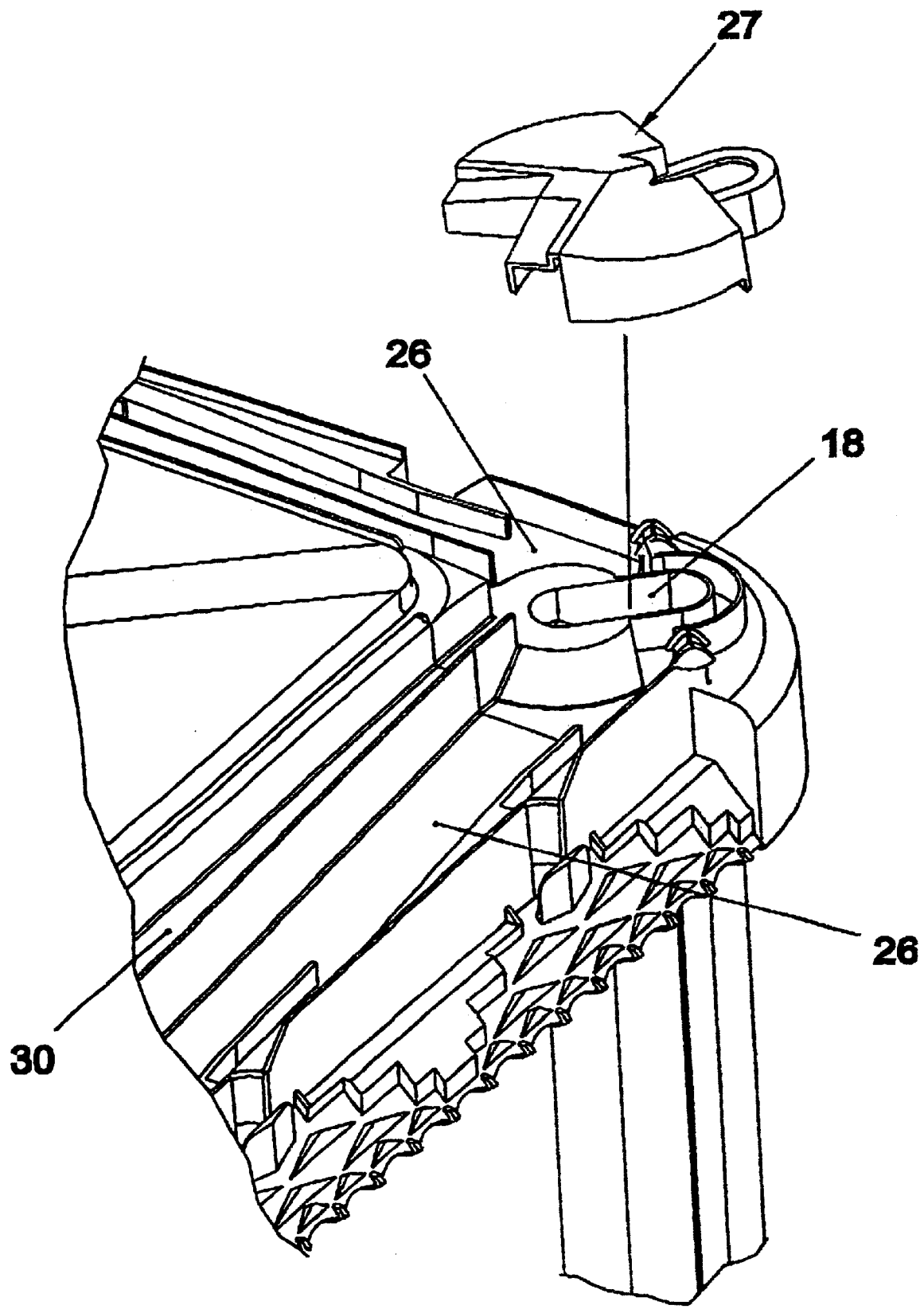
FIG. 3 is an enlarged view of the water entry point of the embodiment of FIGS. 1 and 2.

With reference to FIG. 2, at least one of the side panels 11 contains an absorptive pad containing fibrous absorbent material 21 which is arranged to provide a large surface area for evaporation of the cooling water. An electric or mechanical pump 16 is in water flow communication with the cooling water, so that when the evaporative air conditioner is in use the said cooling water flows via a conduit 17 to the water entry point 18. Upon striking the underside of the cap 27, shown in more detail in the open position in FIG. 3, and in the closed, working, position in FIG. 4, the water will form a uniform curtain around the peripheral edge of the cap 27. This uniform curtain of water is divided into a plurality of open channels, lower 26 and upper 30, delivering water in precise proportions as determined by the dimensions of the openings of the channels. The precise ratios of the total water flow admitted to the channels 26 and 30 then flow down the channels 26 and 30 without loss or gain of water to the water spreader system, the subject of our concurrent application Australian Provisional Patent PQ 0806 "Improvements in Water Spreading in Evaporative Coolers", thereby spreading the water evenly onto the top of the fibrous absorption material 21 contained in the filter pad frame 11 and runs downwardly therethrough.

Figure 4A:
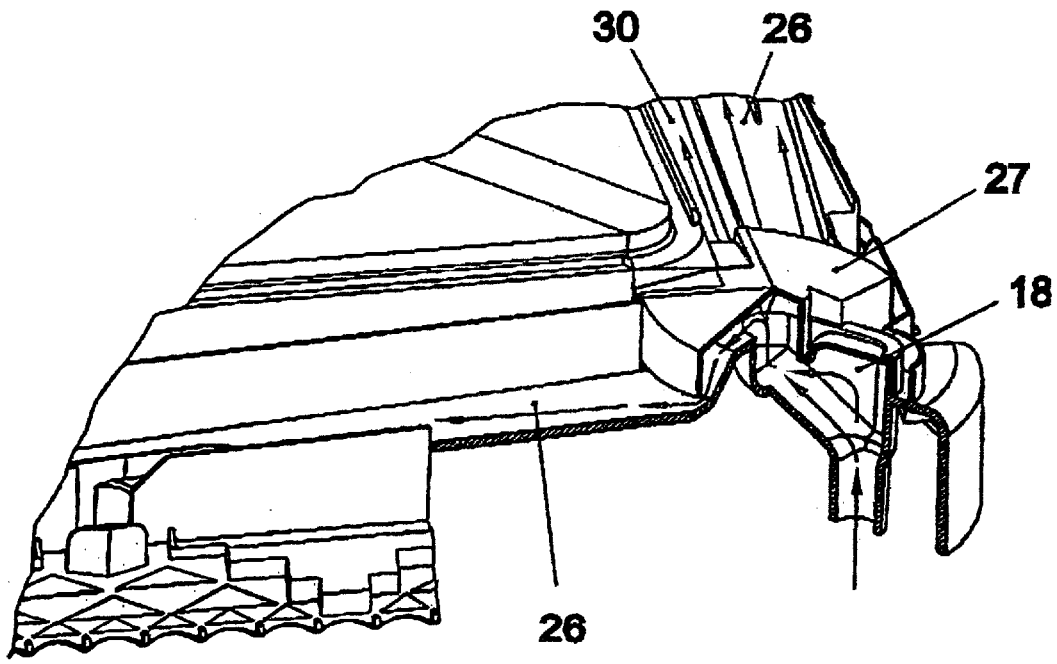
FIG. 4a is a partial cutaway view of the assembled water entry point illustrating the water flow path to a lower distribution channel.
Figure 4B:
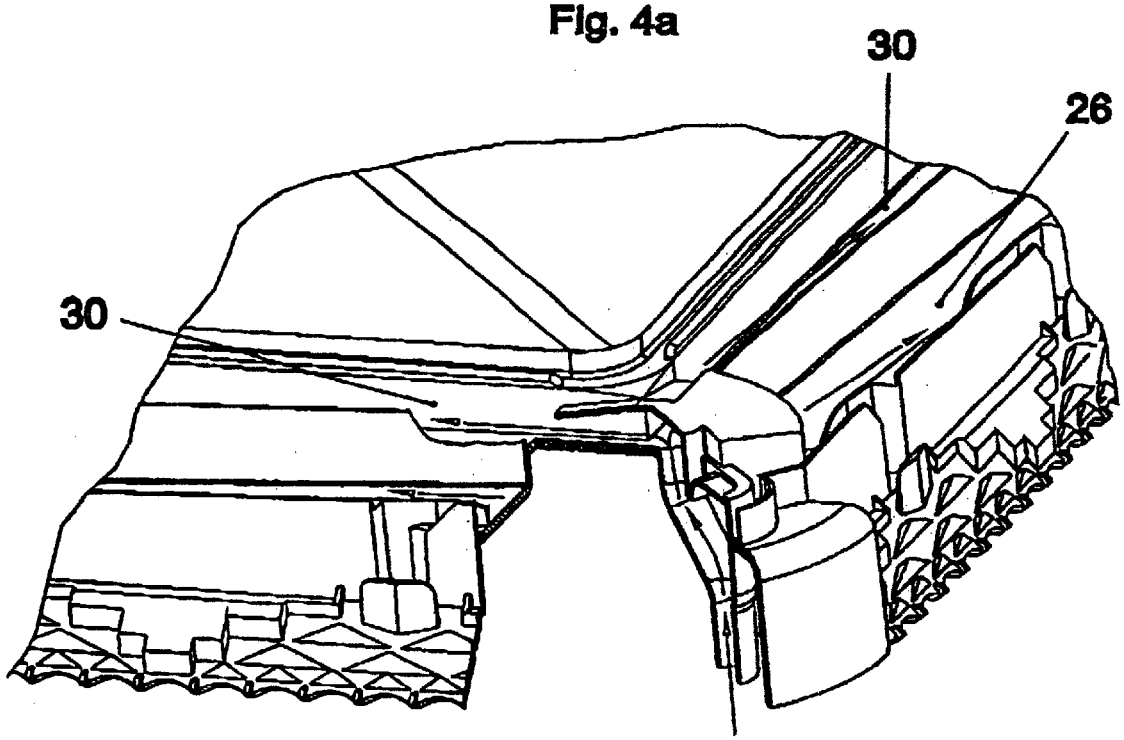
FIG. 4b is a partial cut-away view of the assembled water entry point illustrating the water flow path to a upper distribution channel.

FIGS. 4a and 4b show two different cut-away sectional views through the cap 27, water entry point 18 and upper 30 and lower 26 open channels.

In the depicted embodiment, the water entry point 18, cap 27 and distribution channels 26 and 30 are manufactured as part of the single component forming the entire water distribution system. When fully assembled, the cap 27 shown in FIG. 3 in the open position, is clipped into position as shown in FIG. 4, over the entry point of conduit 17. When water flows through conduit 17, it strikes the underside of the cap 27 so clipped into position, causing water to be uniformly distributed around the partly circular shape of the cap. The water uniformly distributed from the partly circular shape of the cap is then discharged into the plurality of open channels 26 and 30.

In the embodiment shown in the drawings, there is a single point entry of water to the distribution system, thereby eliminating any possible variation in supply rates to multiple entry points. Embodiments of the invention may have multiple water entry points, in which case the advantage of zero variation is supply rates to distributors is lost, but all other advantages are retained.

Water striking the underside of cap 27 is distributed as a curtain under pressure around the inner surfaces of the cap 27. A proportion of the curtain of water so produced flows through the gap between the cap 27 and upper open channels 30. Channels 30 deliver the water entering it to the sides of the evaporative cooler furthest from the water entry point 18 by a uniform slope between the entry point of water to the channels and the corner of the evaporative cooler furthest from the water entry point 18. The width of the channels 30 increase uniformly along their length in a manner which progressively slows the water velocity in the channel before it reaches the farthest corner of the evaporative cooler from the water entry point 18. A high water velocity immediately upon entering channels 30 propels water along the channel even with a low slope angle of the channels 30. A low water velocity at said farthest corner improves the flow of water around the corner. The disclosed embodiment achieves both of these objectives.

A proportion of the water curtain on the underside of cap 27 flows to the lower open channels 26. The lower open channels 26 are close to the water distribution system, the subject of our concurrent application, Australian Provisional Patent PQ 0806, and require a low water velocity for entry to the water distribution system. Water exits the cap 27 into open channels 26 through an opening between cap 27 and channel 26 arranged to be under the normal water level when operating, as illustrated in FIGS. 4a and 4b. This arrangement lowers the water velocity entering the channel, and prevents the formation of bubbles in the water at the discharge point. The presence of bubbles in the water so delivered has been found to have a detrimental effect on the uniformity of water distribution in the water spreader system, the subject of our concurrent application, Australian Provisional Patent PQ 0806.

The present invention may also be applied to multiple water entry points, in which case the upper channels 30 may not be required.

While it is preferred that the cap 18 is formed as part of the single part forming the entire water distribution system, performance is not reduced if the cap is manufactured as a separate part.

In the depicted embodiment, all water enters the water distribution system through one corner of the cooler. There are no obstacles placed in the airstream between the absorptive pad 21 and the fan 23 as a result of the water distribution system. Connections of the water supply pipe 17 to the water entry point can be readily contained within the structure of the corner post of the cooler. Any failure in the water supply pipe connections to the water entry point will not result in water being admitted to the air stream to the fan 23.

All of the components of the water distribution system of the embodiment shown in the drawings have been formed and operate on the upper surface of the lid of the evaporative cooler. There is no possibility of water entering the main body of the evaporative cooler. Cleaning and removing blockages from the water supply system to the water distributors can easily be achieved from outside the evaporative cooler by the removal of the side panels 11 only.

In this embodiment, the cabinet top panel and all components of the water entry and distribution system are injection moulded from plastic material. However, any other suitable preferably non-corrodable material could be used.

As can be seen from the depicted embodiment, water is distributed evenly to all the channels supplying water to the wetted evaporative pads from a single distribution point, or multiple distribution points, which are not within the main bulk of the evaporative cooler. All components of the water entry and distribution system could be manufactured from a single part. The system is not affected by out of level installations up to the limitations of the channel depths, and the large channel widths provide a much reduced tendency to blockage from foreign material.

In an alternative embodiment not shown, the single distribution point is divided into multiple distribution points, each of which provides water distribution to a proportion of the filter pad area. This alternative embodiment is useful on large evaporative coolers in which the water channel lengths become impracticably long, for example. It will be obvious to those skilled in the art that all of the advantages of the present invention will be achieved from each individual distribution point. However, the advantage of avoiding variations in flow to the multiple distribution points will not be available.

This invention in its preferred form provides a water entry system for an evaporative air conditioner which facilitates uniformity of water distribution, resistance to clogging of the water ways, entry of water at the corner(s) of the cooler and the location of the entire water distribution system on top of the lid of the cooler.

The claims defining the invention are as follows:

1. A water entry system for facilitating delivery of water to a water distributor of an evaporative cooler, said water entry system comprising:

conduit means for conveying water to the top of one or more corners of said evaporative cooler, a water entry point at the top of said one or more corners, a cap covering said water entry point, said cap being shaped to produce a curtain of water feeding a plurality of channel means for conveying water from the water entry point to a water spreader.

2. A water entry system as claimed in claim 1, wherein the conduit means is connected to supply water to only one water entry point.

3. A water entry system as claimed in claim 1, wherein all parts of the system except the conduit means are located on the top surface of a lid of the evaporative cooler.

4. A water entry system as claimed in claim 1, wherein the cap is manufactured as one part in combination with a lid of the evaporative cooler.

5. A water entry system as claimed in claim 1, wherein an edge of the cap adjacent to one of said channel means is adapted to direct water to an absorptive pad closest to the water entry point, said edge being beneath a normal in use water level in one of said channels.

6. A water entry system as claimed in claim 1, wherein the channel means adapted to direct water to an absorptive pad most distant from the water entry point is configured to enable acceleration of the flow of water to the most distant pad.

7. A water entry system as claimed in claim 1, wherein all parts of the system, when in situ in an evaporative cooler, are accessible from outside the evaporative cooler when a side panel or panels of the cooler are removed.

\* \* \* \* \*